(12) United States Patent
Cousin

(10) Patent No.: US 8,776,661 B2
(45) Date of Patent: Jul. 15, 2014

(54) CONNECTING DEVICE HAVING PYROTECHNIC RUPTURE

(75) Inventor: Jean-Yves Cousin, Armentieres (FR)

(73) Assignee: Astrium SAS, Suresnes (FR)

( * ) Notice: Subject to any disclaimer, the term of this patent is extended or adjusted under 35 U.S.C. 154(b) by 0 days.

(21) Appl. No.: 13/581,545

(22) PCT Filed: Feb. 18, 2011

(86) PCT No.: PCT/FR2011/050346
§ 371 (c)(1),
(2), (4) Date: Aug. 28, 2012

(87) PCT Pub. No.: WO2011/107690
PCT Pub. Date: Sep. 9, 2011

(65) Prior Publication Data
US 2012/0318125 A1 Dec. 20, 2012

(30) Foreign Application Priority Data
Mar. 2, 2010 (FR) ...................... 10 51497

(51) Int. Cl.
*F42B 15/36* (2006.01)
*F42B 15/38* (2006.01)
*F16B 31/00* (2006.01)

(52) U.S. Cl.
CPC ................ *F42B 15/38* (2013.01); *B61G 1/645* (2013.01); *F16B 31/005* (2013.01)
USPC .......................................... 89/1.14; 102/378

(58) Field of Classification Search
USPC ......................... 89/1.14; 137/68.13; 83/639.4; 294/82.29; 102/378; 403/11
See application file for complete search history.

(56) References Cited

U.S. PATENT DOCUMENTS 3,230,885 A * 1/1966 Weber et al. .................... 403/11
5,109,749 A 5/1992 Olcer

FOREIGN PATENT DOCUMENTS

EP 0 246 958 A1 11/1987
EP 1 319 920 A1 6/2003
EP 1319920 A1 * 6/2003 .............. F42B 15/38

OTHER PUBLICATIONS

International Search Report completed May 26, 2011 and mailed Jun. 6, 2011 from corresponding International Application No. PCT/FR2011/050346 filed Feb. 18, 2011 (2 pages).
Written Opinion completed May 26, 2011 and mailed Jun. 6, 2011 from corresponding International Application No. PCT/FR2011/050346 filed Feb. 18, 2011 (13 pages).

* cited by examiner

*Primary Examiner* — Samir Abdosh
*Assistant Examiner* — John D Cooper
(74) *Attorney, Agent, or Firm* — Klein, O'Neill & Singh, LLP

(57) ABSTRACT

According to the present disclosure, devices, systems, and methods are disclosed in which two substantially parallel flanges are provided with rupture areas, respectively, located in the same element of the elements to be connected. In the disclosed device, the rupture areas and the portions of the flanges outside the rupture area are arranged so as to prevent the connected elements from catching after the separation thereof, and to limit the vibrations induced in the element in said rupture areas.

21 Claims, 2 Drawing Sheets

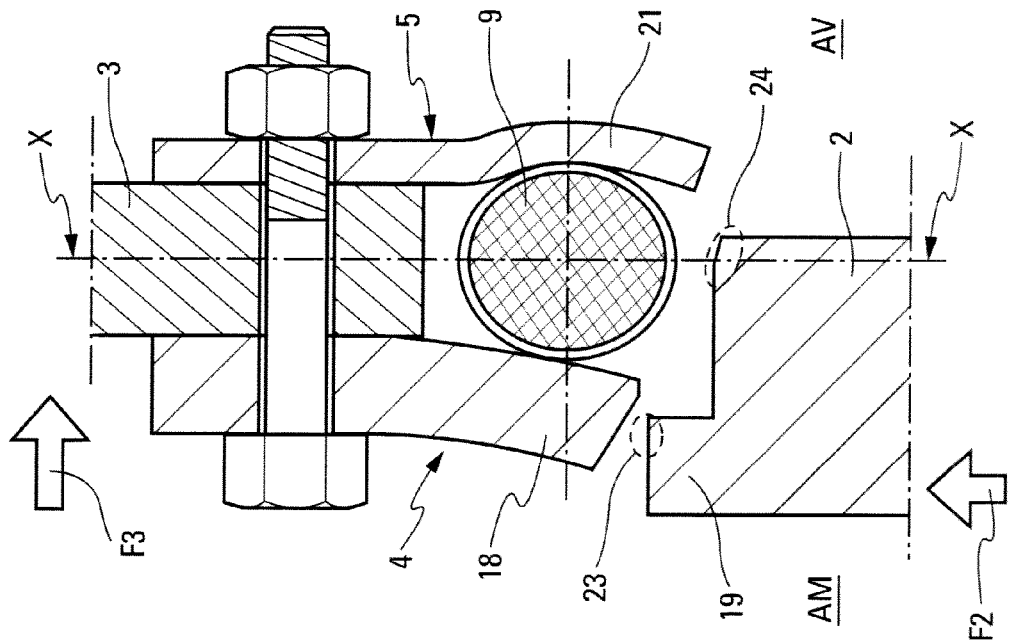
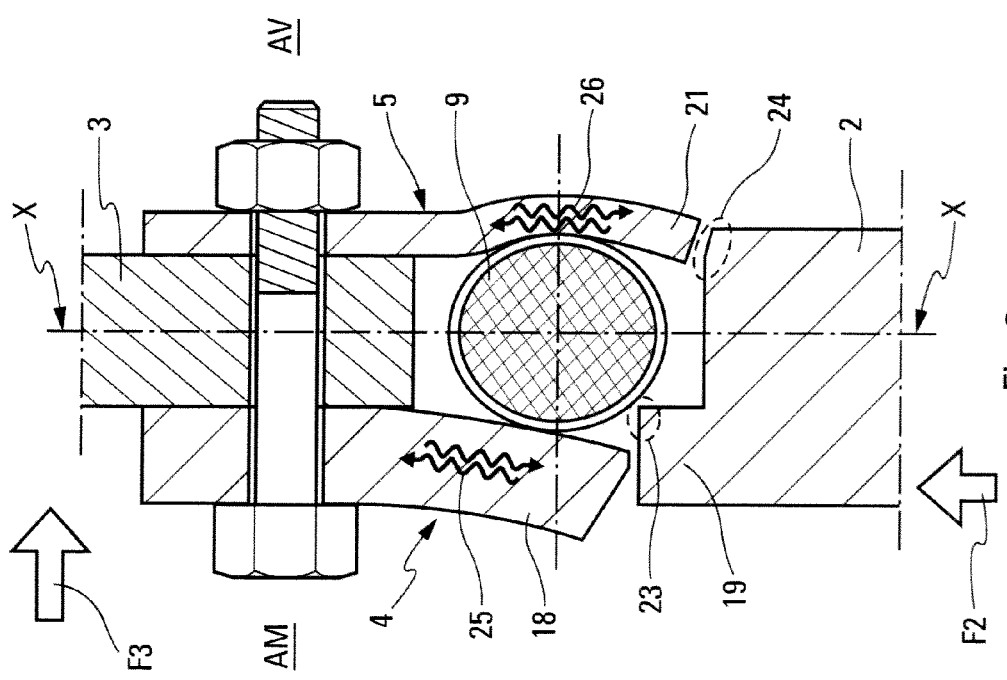

CONNECTING DEVICE HAVING PYROTECHNIC RUPTURE

CROSS-REFERENCE TO RELATED APPLICATION

This is a national phase application under 35 U.S.C. §371 of PCT Application No. PCT/FR2011/050346, filed Feb. 18, 2011, which claims the benefit of French application No. 1051497, filed Mar. 2, 2010, the contents of each of which are expressly incorporated herein by reference.

FIELD OF ART

The present disclosure relates to a device, system, and method for connecting device between two plate-shaped elements, such device being adapted to be ruptured through a detonating charge, such as a pyrotechnic fuse (or cord).

Although not exclusively, the device according to aspects of the present disclosure is particularly provided for the aeronautic and spatial fields so as to allow the separation of some parts of aircraft or special launchers. For example, such a device can provide the connection between the different parts of the high structures of a launcher (i.e. the satellite protecting cover) and lead, when the pyrotechnic fuse is activated, to the separation of said parts.

BACKGROUND

It is already known from the document EP 0 246 958 such a connecting device operating by a symmetric double cutting and comprising two substantially parallel flanges:
  connecting opposite edges of said elements by providing together the mechanical strength of said connection,
  arranging between them a groove in which a pyrotechnic fuse with an oblong section with flat flanks and rounded ends is housed, said flat flanks being substantially parallel and respectively arranged opposite said flanges, and
  each provided with a rupture area, said rupture areas of both flanges being on the same side of said elements.

In the connecting device of this prior document, the rupture areas present a section being tapered in the plan perpendicular to the flat flanks of the fuse, and thus a smaller resistance to the abrupt expansion of said fuse after the activation thereof. These rupture areas are identical and arranged on a coplanar way. i.e. at the same level with respect to the pyrotechnic fuse, and more precisely in the vicinity of the top of the rounded end being located on the side of said rupture areas. Both flanges are in turn parallel to the flat flanks of the fuse and of a same thickness.

Upon the activation of the fuse, the latter abruptly expands and strikes both flanges, which leads to the rupture of said flanges at the level of their rupture areas, and thus the separation, and then the removal of the two elements initially connected by the device, this removal occurring in a direction being parallel to the flat flanks of the fuse.

Due to the perfect symmetry of the above mentioned connecting device, the shock waves appearing upon the fuse strike, propagating within the flanges and being transmitted to the adjacent elements so as to induce vibrations therein, are at least partially neutralized. Indeed, the rupture areas are sectioned simultaneously and on the same way due to the effect of the fuse expansion, which generates in both flanges shock waves not only in phase agreement, but also of the same nature and level, thus absolutely identical. It results therefrom that, upon the superposition of such waves at the level of the elements being adjacent to the flanges, some of the harmonics cancel each other out. The resulting vibration suffered by said elements, especially the one an element being integral with a spatial machine would suffer, is thus significantly reduced.

Such connecting device with a symmetric double cutting thus allows the separation of two elements by means of a pyrotechnic fuse, while limiting the vibrations that were generated by the impact of the fuse and that said elements are subjected to.

However, although such device is perfectly convenient for an axial removal of the elements, i.e. parallel to the flat flanks of the fuse, a major drawback is met when the matter is to remove said elements along one direction being at least partially transverse to said flat flanks, as it is the case in most of the satellite protecting covers, into several parts where a thrust is exerted in the transverse direction to said flat flanks so as to make the disengagement of each of the parts of said covers easier.

Indeed, at the level of each of the flanges, the breaking surface of each of the two separated parts of the flange, generated by the rupture being subsequent to the fuse activation, is irregular. Upon then, when said two elements are removed from each other at least in part laterally, said two parts separated from the flange are at a risk to be mutually caught, at the level of the irregularities their respective breaking surfaces are provided with. It thus results therefrom a significantly downgraded relative removal of both elements.

Moreover, in the case, for example, of the separation of an invariable (lower) element and an ejecting (higher) element forming the cover of a spatial machine, said machine is propelled along the direction being parallel to the flat flanks of the fuse and in a direction from the invariable element to the ejecting element. The thrust force generated by the propulsion of said machine then tends to make said elements closer after their separation, said two elements being then able to strike each other and thus to be mutually caught.

SUMMARY

The present device, system, and method aim at remedying such drawbacks and relates to a connecting device between two plate-shaped elements:
  adapted to be ruptured by a double cutting,
  compatible with a removal of the elements occurring at least in part transverse to the flat flanks of the pyrotechnic fuse, i.e. the elements of which do not catch each other upon their removal, and
  taking profit from the limitation of the shocks being induced provided by a connecting device with a perfectly symmetrical double cut.

With the end in view, according to the present disclosure, the connecting device of the above reminded type is remarkable in that, so as not to be opposed, after a rupture resulting from the activation of said fuse, to the relative removal of said elements at least in part transversally relative to said flat flanks of said fuse:
  the flange rupture area upstream from the direction of said removal is arranged in the vicinity of the connection between, on the one side, the flat flank of said use opposite said upstream flange and, on the other side, the rounded end of said fuse being on the side of said rupture areas,
  the part of said upstream flange, being adjacent to said upstream rupture area and on the side opposite said rupture areas, presents a larger thickness than the one of the corresponding part of the flange downstream from the direction of said removal, and the rupture area of said downstream flange:

is arranged in the vicinity of the top of the rounded end of the fuse located on the side of said rupture areas, and presents a larger thickness than the one of said upstream rupture area so as to compensate for the delay between the shock waves generated by the activation of said fuse and respectively transmitted by said flanges to the element being located on the side of said rupture areas.

Thus, thanks to the present device, system, and method, the rupture of the upstream flange is carried out by a pure shearing due to the fact that:

the appropriate positioning of the upstream rupture area is located in the vicinity of the junction between the upstream flat flank of the fuse and the rounded end of the fuse on the side of the rupture areas, and the overthickness of the part of the upstream flange being adjacent to the upstream rupture area and on the side opposite the rupture areas makes this part resistant to the distortion under the effect of the fuse impact.

In such a way, it is ensured that the breaking surface of each of the two parts separated from the upstream flange it is as flat as possible, i.e. in the plan perpendicular to the flat flanks of the fuse, and that such surface presents a minimum of roughness. It is thus avoided that both parts separated from said upstream flange do not catch each other through their respective remaining surfaces upon their at least partly lateral relative removal.

Moreover, thanks also to the device, system, and method of the present disclosure, the rupture of the downstream flange is made by a pure bending due to the fact that the appropriate positioning of the downstream rupture area is located in the vicinity of the top of the rounded end of the fuse on the side of the rupture areas. Such cutting mode tends to distort the downstream flange under the effect of the impact of the pyrotechnic fuse and leads to its winding around said fuse. The breaking surface of each of the two parts separated from said downstream flange are then tilted in a direction allowing to avoid the catching of said both parts upon their at least partly lateral relative removal.

Still thanks to the device, system, and method of the present disclosure, the shocks suffered by the element being on the side of the rupture areas—that is to be protected from the vibrations—are limited due to the fact that it is acted on the thickness of the downstream rupture areas so as to compensate for the delay between the shock waves transmitted to said element respectively by the two flanges. Such delay, generated by the dissymmetry being introduced is thus corrected so that the shock waves are transmitted to said element in a phase agreement, which allows upon their superposition on said element a mutual cancellation of at least one part of their components.

Thus, according to the present device, system, and method, a dissymmetry is introduced into the flanges so as to avoid any mechanical catching between the two elements upon their at least partly lateral removal, which can seem to be illogical when it is known that it is just the flange symmetry that permits the limitation of the shocks received by said two elements further to the activation of the pyrotechnic fuse. Indeed, according to the present device, system, and method, the advantage provided by the flange symmetry can be surprisingly reproduced by the particular arrangement according to the device, system, and method—always dissymmetric—of the rupture areas of both flanges.

According to another characteristic of the present device, system, and method, the thickness of the downstream rupture area is determined so as to allow the simultaneous rupture of the flanges after the activation of the pyrotechnic fuse. In fact, it has been observed in a comparative study between several types of configurations and the corresponding shock measurements, that the rupture time is the parameter that generally predominates as far as the vibrations received by the element to be protected to the detriment of other parameters such as the propagation times of the shock waves within the flanges. Now, due to the dissymmetry of the device, the efforts applied to each rupture area are different. Thus, by arranging adequately both rupture areas one relative to the other, the consequences of the dissymmetry are compensated for so as to obtain, as for a device with a symmetrical double cutting, ruptures being simultaneous.

In the above mentioned case of the separation of an invariable element and an ejecting element forming the cover of a spatial machine, said machine being propelled in a direction parallel to the flat flanges of the pyrotechnic fuse and in a direction going from the invariable element towards the ejecting element, it can occur at the level of the upstream flange and after the separation of the two elements, on the one side, a bringing of the lower part closer to the higher part due to the propulsion of the machine, and, on the other side, the driving of the higher part towards the inside of the cover. The lower and higher parts of the upstream flange are then able to strike each other and it results therefrom that the lower part can block the higher part so that it avoids said higher part to be ejected towards the outside of the cover. In order to remedy this type of risk, according to another characteristic of the present device, system, and method. the part of the upstream flange, adjacent to the upstream rupture area and on the side of the rupture areas, presents a thickness being substantially equal to the one of the part of said upstream flange, adjacent to said upstream rupture area and on the side opposite said rupture areas. Thus, the lower part of the upstream flange forms a broad table on which the higher part can possibly abut if such two parts are caused to be struck. Any blocking is then avoided.

According to another characteristic of the present device, system, and method, the product of the thicknesses in the upstream rupture area and the part of the upstream flange adjacent to said upstream rupture area and on the side opposite the rupture areas, is substantially proportional to the product of the thicknesses of the downstream rupture area and the part of the downstream flange being adjacent to said downstream rupture area and on the side opposite said rupture areas. The experiences and trials performed on those parameters have in fact enabled to observe that surprisingly, the above mentioned relationship produces a compensation effect for the shock waves.

According to another characteristic of the present device, system, and method, the flanges form projecting parts of one of the elements or of a single connecting element fastened to each of said elements. Thus, both plates can be made from a same part that can be either directly one to the parts to be separated, or indirectly, an additional intermediate part, thereby making not only the manufacture of the plates, but also their mechanical assembling to the rest of the system easier.

Although, each of said flanges can extend along the whole length of said fuse, preferably, the device according to the present disclosure comprises a plurality of individual or individualized flange pairs distributed along said fuse.

BRIEF DESCRIPTION OF THE DRAWINGS

The figures of the accompanying drawing will make well understood how the present device, system, and method can be implemented. On those figures, identical references denote similar elements.

FIG. 3 is a section corresponding to FIG. 1 at the moment of the rupture of said device.

FIG. 4 is a section corresponding to FIGS. 1 and 3 upon the relative removal of the elements connected by said device.

DETAILED DESCRIPTION

Figure 1:
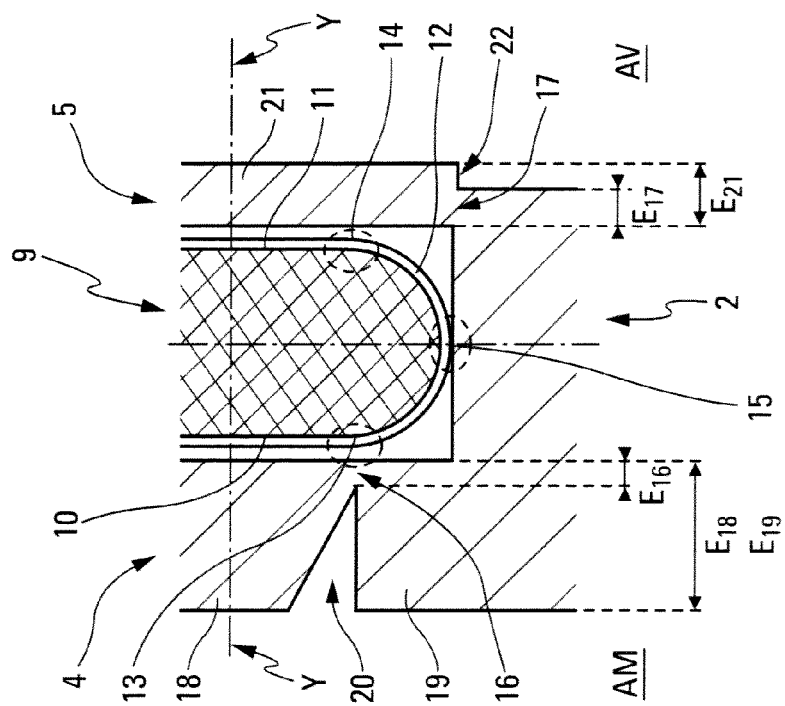
FIG. 1 is a schematic longitudinal section of a connecting device, according to the present disclosure, between two plate-shaped elements.
Figure 2:
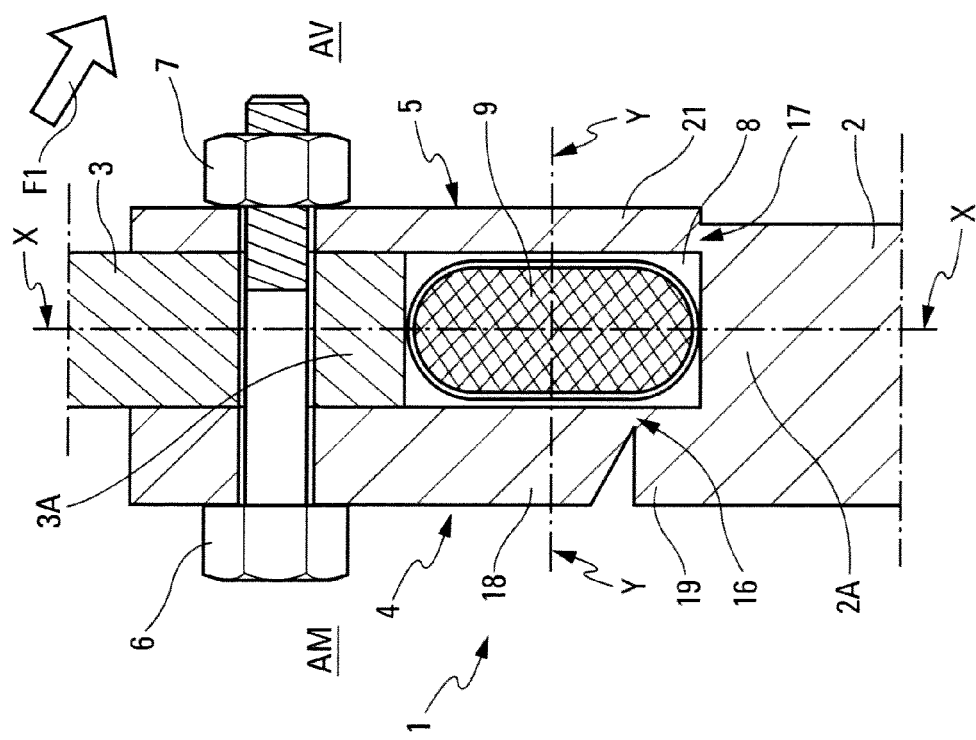
FIG. 2 is an enlarged view of the lower part of this same device.

The connecting device 1 of FIGS. 1 and 2 is provided for assembling, then allowing the separation of two plate-shaped elements 2 and 3, such as for example the external cylindrical shells forming two of the stages of a high structure in a spatial launcher. Amongst these two elements to be separated, the first (lower) element 2 should stay integral with the spatial launcher, whereas the second (higher) element 3 can be ejected, upon the rupture of the device, in a removal direction represented by the arrow F1.

To make such connection, the device 1 comprises two flanges 4 and 5 parallel between them and arranged opposite each other. Such flanges provide together the mechanical integration of the connection between the elements 2 and 3, by connecting them through their opposite edges 2A and 3A, which can be done on different ways. In the present example, it is envisaged to make the higher end of the lower element 2 so that said two flanges 4 and 5 form parts projecting from said edge 2A of the element 2, thus presenting a U-shaped end. The edge 3A of the higher element 3 presents in turn a section being determined so that it can be inserted between the two projecting flanges of the lower element 2. Upon then, after the introduction of the edge 3A of the element 3 between the two flanges 4 and 5 of the edge 2A of the element 2, it is possible to assemble said edges 2A and 3A by a through-bolt 6 cooperating with a nut 7.

This connecting device is adapted to be broken so as to allow the separation of the elements 2 and 3 and the ejection of the higher element 3 so as for example to release a satellite enclosed until then within a shell formed with the elements 3. Through this arrangement, a first upstream flange 4 is defined on the upstream side of the flange (AM) and a second downstream flange 5 on the downstream side of the flange (AV), by reference to the at least partly lateral removal direction F1.

It will be noticed that such a device can be easily mounted because, prior to the fastening on the two elements, the two flanges and the pyrotechnic fuse can be assembled. A subsystem is thus made, which can be then fastened as a single block to said elements.

The two flanges 4 and 5 form between them a groove 8 in which, in addition of at least a part of the edge 3A of the element 3, a pyrotechnic fuse 9 is housed. The fuse 9 is inserted in a known way in an expansible tube so as to avoid a subsequent pollution of the space. It is arranged so as to fill almost integrally the part of the groove 8 remained free by the edge 3A of the element 3 so as to be as close as possible to the flanges 4 and 5.

The fuse 9 presents an oblong section provided with two flat flanks 10 and 11 connected by two rounded ends (one lower 12 and one higher not referenced). These flanks 10 and 11 are especially connected to the lower rounded end 12 (on the side of the invariable element 2) at the level of the respective connections 13 and 14. Such lower end 12 presents a top 15. The flanks 10 and 11 are parallel between them and parallel to a longitudinal axis X-X so as to be able to be respectively arranged opposite the flanges 4 and 5, themselves parallel to the axis X-X.

The upstream flange 4 is provided with a rupture area 16 and the downstream flange with a rupture area 17. The section of each of those rupture areas 16 and 17 is weakened according to an axis Y-Y perpendicular to the flat flanks 10 and 11 of the fuse 9, thereby also reducing the resistance of said areas 16 and 17 with respect of the impact and the abrupt expansion of said fuse 9. Thus, after the activation of the fuse, the latter expands and strikes the flanges 4 and 5, generating the rupture of said flanges at the level of their respective rupture areas 16 and 17, and consequently, the separation of the elements 2 and 3. Such rupture areas are arranged on the side of the invariable element 2 to be protected against vibrations.

The connecting device 1 according to the present disclosure is arranged such that the rupture resulting from the activation of the fuse 9 allows the relative removal of the elements 2 and 3 in the direction of the arrow F1, said direction being partly transverse to the flat flanks 10 and 11 of said fuse. This device performs to this end a dissymmetric double cutting with a mixed rupture mode (shearing upstream, bending downstream), the two rupture areas 16 and 17 being not coplanar, as described hereinunder in reference to FIG. 2, corresponding to an enlarged view of the lower part of the device of FIG. 1.

The rupture area 16 of the upstream flange 4 is arranged, relative to the axis X-X of the flanks 10 and 11 of the fuse 9, on the side of the invariable lower element 12. More precisely, this upstream rupture area 16 is arranged in the vicinity of the connection 13 between, on the one side, the flat flank 10 opposite to said upstream flange 4 and, on the other side, the lower rounded end 12 (i.e. the end located on the side of the element 2 and the rupture areas 16 and 17). This rupture area 16 thus separates the upstream flange 4 into two parts: a higher part 18 and a lower part 19. Such arrangement is favourable for obtaining a rupture of the upstream flange 4 by a pure shearing.

The upstream rupture area 16 is for example obtained by making a simple V-shaped notch 20 in the thickness of the upstream flange 4 so that the lower surface of the notch (and thus the higher surface of the part 19 of the upstream flange) is parallel to the axis X-X. It goes without saying that other alternatives are to be envisaged, in particular a double V-shaped notch on either part of said part 19.

The rupture area 17 of the downstream flange 5 is arranged, relative to the axis X-X of the flanks 10 and 11 of the fuse 9, on the side of the invariable lower element 2. More precisely, this downstream rupture area 17 is arranged in the vicinity of the top 15 of the lower rounded end 12 of the fuse 9 (i.e. the end being located on the side of the element 2 and the rupture areas 16 and 17). This area 17 is thus positioned on the lower end of the downstream flange 5 such that it performs the separation between, on the one side, the higher part 21 of said downstream flange 5 and, on the other side, the (not referenced) common trunk of the invariable element (2), the projecting parts forming the flanges 4 and 5 of which are originated. Such arrangement allows the downstream flange 5 to be broken through a pure bending.

The downstream rupture area 17 is for example obtained by making a shoulder 22, thereby forming a thickness discontinuity between the downstream flange 5 and the common trunk of the element 2. It goes without saying that other alternative embodiments are to be envisaged, in particular a simple V-shaped notch.

The higher part 18 of the upstream flange 4, corresponding to the part of the flange adjacent to the upstream rupture area 16 and on the side opposite the lower element 2 and the rupture areas 16 and 17, presents a thickness $E_{18}$ higher than the one $E_{21}$ of the corresponding part 21 of the downstream flange 5 (i.e. the higher part 21 of the downstream flange 5 adjacent to the rupture area 17 and located on the side opposite the lower element 2 and the rupture areas). At all events, the overthickness of this part 18 is determined so as to avoid the distortion of said part 18 under the impact of the fuse 9, as illustrated hereinunder referring to FIGS. 3 and 4.

The lower part 19 of the upstream flange 4 adjacent to the upstream rupture area 16 and located on the side of the element 2 and the rupture areas 16 and 17, presents a thickness E19 substantially equal to the one E18 of the higher part 18 of this same upstream flange 4 adjacent to said upstream rupture area 16 and located on the side opposite said rupture areas 16 and 17. At all events, the thickness E18 is determined so that the lower part 19 may form a possible abutment for the higher part 18 after their separation and upon their relative removal, in the case when a thrust force tends to bring them apart from each other, as illustrated hereinunder referring to FIGS. 3 and 4.

The downstream rupture area 17 presents a thickness E17 higher than the one E16 of the upstream rupture area 16, both thicknesses being specifically determined relative to each other—and relative to other parameters such as the thicknesses of the other parts of the flanges—so as to break the flanges 4 and 5 simultaneously further to the activation of the fuse 9, thereby following to compensate for the delay between the shock waves generated by the activation of said fuse and respectively transmitted by said flanges to the element 2 to be protected.

The effects produced by such configuration are illustrated by FIGS. 3 and 4. showing the evolution of the connecting device at two successive moments after the activation of the pyrotechnic fuse.

A few moments after the activation, the pyrotechnic fuse 9 significantly expands (FIG. 3). Then, it is not oblong any longer, but adopts a quasi circular shape, thereby leading to its contact with the walls of both flanges 4 and 5. The fuse 9 then strikes said flanges up to cause the breaking thereof at the level of their respective rupture areas 16 and 17.

The ejecting element 3 is then ejected according the direction of the arrow F1 (FIG. 1), while being subjected to the forces represented by the arrows F2 and F3:

a propelling force F2 for the machine, the direction of which is parallel to the flat flanks 10 and 11 of the fuse and which tends to bring the element 2 closer to the element 3 after the separation, and, a lateral ejection force F3 for the parts of the machine cover, the direction of which is perpendicular to the flat flanks 10 and 11 of the fuse and tends to eject the element 3 towards the outside AV of the machine on the downstream side.

At the level of the upstream flange 4, due to the positioning of the rupture area 16, cutting of the latter occurs by pure shearing. Moreover, the overthickness provided in the higher part 18 of the upstream flange makes the latter resistant to the distortion under the effect of the abrupt expansion of the fuse 9, thereby allowing not to distort said flange 4, but only to tilt it. It results therefrom that the cutting of the upstream rupture area 16 is fairly made, with a substantially plan breaking surface 23 remaining at the level of the lower part 19 and it is the same for the breaking surface (not referenced) at the level of the higher part 18 of the upstream flange. Upon their relative removal that, in the first moments after the activation of the fuse (FIG. 3), occurs in the opposite direction to this of the ejection of the covers (F3) due to the tilting of the upstream flange, the breaking surfaces—without roughness—of the parts 18 and 19 do not thus catch each other.

Still at the level of the flange 4, when the higher 18 and lower 19 parts have just been separated, the propelling force F2 brings the part 19 closer to the part 18. Since the part 19 presents a thickness at least equal to this of the part 18. the latter may then abut on the part 19 in the case where said two parts would be brought closer (FIG. 3), thereby avoiding that said higher part 18 is blocked by the lower part 19 and cannot then be ejected any longer in the direction of the ejection force F3 (FIG. 4).

Then, at the level of the downstream flange 5, due to the positioning of the rupture area 17, the cutting of the latter occurs by pure bending. In addition. the thickness E21 of the higher part 21 of the downstream flange 5 being weak, said higher part 21 is distorted and is wound around the fuse after the breaking of the downstream flange. Upon then, the breaking surface 24 at the level of the element 2 is substantially plan and tilted relative to the axis Y-Y, in a direction allowing to avoid the element 2 and the part 21 from being caught upon their relative removal, said part 21 being distorted while winding around said fuse 9, thereby forming an axial clearance relative to the breaking surface 24 of the element 2 and allowing any contact to be avoided at such level.

Upon the expansion of the pyrotechnic fuse 9, the latter strikes the flanges 4 and 5 and generates shock waves 25 and 26 therein. Such waves are respectively propagated in the flanges 4 and 5 to be then, during the first moments further to the separation (FIG. 3), transmitted particularly to the lower element 2, within which said waves 25 and 26 are also propagated and induce vibrations therein. Due to the dissymmetry of the device 1, if the thicknesses of the rupture areas 16 and 17 were equal, the upstream flange 4 would break later than the downstream flange 5, thereby introducing a delay between the shock waves 25 and 26, which could induce a high level of vibrations at the level of the element 2.

The thickness $E_{17}$ of the downstream rupture area 17 is determined to compensate for the effect of the dissymmetry of the device. More precisely, it is made such that this thickness $E_{17}$ is such, relative to the thickness $E_{16}$ and to other parameters such as the thicknesses of the other parts of the flanges, that the flanges 4 and 5 are broken at the same moment, cancelling in such a way the delay between the shock waves 25 and 26 generated by the activation of the fuse 9 and transmitted respectively by the flanges 4 and 5 to the element 2 to be protected. Indeed, it has been observed that the offset between the two rupture moments is the main parameter amongst the ones influencing the delay between the waves 25 and 26 and thus the impact of the shocks induced at the level of the element 2.

Thus, as for a symmetrical device, simultaneous ruptures of the flanges 4 and 5 are obtained and thus shock waves 25 and 26 substantially in phase agreement at the moment of their transmission to the element 2. When such waves are superposed, a mutual cancellation of part of their components thus occurs, in particular some harmonics, and the vibrations being induced are consequently limited thereby.

The man of the art will understand that the choice of the thickness E17 is a function of the thickness E 16, but also of the position of the rupture areas, of the thicknesses of the parts of the flanges outside the rupture area, as well as of the materials of said flanges.

In the embodiment illustrated by FIGS. 1 to 4, the product P1 of the thicknesses, on the one side, of the upstream rupture area 16 (E16) and, on the other side, of the higher part 18 of the upstream flange 4 (E18) adjacent to said upstream rupture area 16 and on the side opposite to the rupture areas 16 and 17, is equal to the product P2 of the thicknesses, on the one side, of the downstream rupture area 17 (E17) and, on the other side, of the part 21 of the downstream flange 5 (E21), adjacent to said downstream rupture area 17 and on the side opposite said rupture areas.

In a practical embodiment, the following thicknesses have been selected:

thickness of the part 18 (outside the rupture area) of the flange 4: $E_{18}$=5 mm thickness of the rupture area 16 of the flange 4: $E_{16}$=1.2 mm, thickness of the part 21 (outside the rupture area) of the flange 5: $E_{21}$=4 mm, and thickness of the rupture area 17 of the flange 5: $E_{17}$=1.5 mm.

A first product $P_1=E_{18}*E_{16}=5*1.2=6$ and a second product $P_2=E_{21}*E_{17}=4*1.5=6$ are then obtained. It will be understood that, through this relationship, if one of these four parameters is modified, it then matters to compensate for this by modifying another of the parameters so as to keep the proportionality.

It will be noticed that, in other cases, when the configuration is somewhat different, the products P1 and P2 can be always linked by a proportionality coefficient, but such coefficient is not necessarily unitary.

Upon the implementation of the device according to the device, system, and method to make the cover of a satellite, the two elements 2 and 3 to be separated are arranged along a circular line so as to cover the satellite like a dome. It then matters that the connecting device can be compatible with an annular arrangement. With this end in view, it can be envisaged to provide the device with a plurality of flange pairs, each of which, comprising an upstream flange and a downstream flange opposite each other, forms a crown portion, these flange pairs being able to be arranged adjacent or spaced apart along the fuse 9.

In order to reduce the shock induced in the structure upon the axial distortion of the pyrotechnic fuse and upon then to protect said fuse against the bursting risk, it can be envisaged to punctually position said fuse with elastomer plots (or pads).

Also, in order to avoid some circumferential effects (for example a parasite rupture) as well as to make the assembling of the higher and lower parts of the device easier, it can be envisaged to distribute slots on the circumference of the structure of said device, being ended by holes so as to limit the constraints concentration.

The invention claimed is:

1. A connecting device comprising:
    a first plate shaped element comprising a first edge and a first thickness;
    a second plate shaped element comprising a second edge and a second thickness, which is less than the first thickness;
    a shaped groove having a cavity formed at least in part by the first edge, the second edge, a first flange, and a second flange; said first flange comprising an interior surface, an exterior surface, and a thickness therebetween;
    a pyrotechnic fuse placed in the cavity at a bottom of the shaped groove;
    a bore formed through the first flange, the second flange, and through the first plate shaped element; said bores being aligned and defining a first common bore having a mechanical connector disposed therethrough and secured in place; and
    wherein the first flange comprises a first rupture area defined by a single notch on the exterior surface and through at least part of the thickness so that a remaining thickness remains on the first flange, and the second flange comprises a second rupture area defined by a shoulder at a juncture of a first planar surface and a second planar surface, the distance from the second edge to the first planar surface defining a width, which is greater than the remaining thickness; and
    wherein the second rupture area is located near an end of the pyrotechnic fuse in the shaped groove and the first rupture area is located further away from the end of the pyrotechnic fuse in the shaped groove than the second rupture area.

2. The device of claim 1, wherein the second flange has a thickness at the second rupture area and wherein said thickness is sized to ensure simultaneous rupture of the two flanges after activation of the pyrotechnic fuse.

3. The device of claim 2, wherein shockwaves generated when the first and second rupture areas rupture arrive at the mechanical connector simultaneously.

4. The device of claim 1, wherein the thickness of the first flange on either side of the first rupture area is equal.

5. The device of claim 1, wherein a product of a thickness at the first rupture area and of the thickness of the first flange on either side of the first rupture area is substantially proportional to a product of a thickness at the second rupture area and of a first thickness of the second flange on a first side of the second rupture area and a second thickness of the second flange on a second side of the second rupture area.

6. The device of claim 1, wherein the first flange and the second flange are unitarily formed projecting parts of one of the plate shaped elements or from connecting elements fastened to each of the plate shaped elements.

7. The device of claim 1, wherein the bottom of the shaped cavity is defined by the second edge of the second plate shaped element or the first edge of the first plate shaped element.

8. The device of claim 1, further comprising a second common bore having a second mechanical connector disposed therein to secure the first flange and the second flange together at a second location.

9. A connecting device comprising:
    a first plate shaped element comprising a first edge;
    a second plate shaped element comprising a second edge;
    a shaped groove having a cavity formed at least in part by the first edge, the second edge, a first flange, and a second flange; said first flange comprising an interior surface, an exterior surface, and a thickness therebetween and said second flange comprising a thickness;
    a pyrotechnic fuse placed in the cavity at a bottom of the shaped groove;
    a bore formed through the first flange, the second flange, and through either the first plate shaped element or the second plate shaped element; said bores being aligned and defining a first common bore having a mechanical connector disposed therethrough and secured in place; and wherein the first flange comprises a first rupture area comprising a first thickness and the second flange comprises a second rupture area comprising a second thickness, the first thickness and the second thickness being unequal.

10. The device of claim 9, wherein the mechanical connector is a nut and bolt combination.

11. The device of claim 9, wherein the first and second rupture areas are configured to rupture simultaneously.

12. The device of claim 11, wherein shockwaves generated by the first and second rupture areas when they rupture arrive at the mechanical connector simultaneously.

13. device of claim 9, the first rupture area is defined by a single notch only formed on the exterior surface of the first flange and the second rupture area of the second flange is defined by a first planar surface and a second planar surface with a shoulder therebetween.

14. The device of claim 9, wherein the second edge of the second plate shaped element or the first edge of the first plate shaped element forms the bottom of the shaped groove.

15. The device of claim 9, wherein the thickness of the first flange on either side of the first rupture area is equal.

16. The device of claim 9, wherein the thickness of the first flange is larger than the thickness of the second flange.

17. The device of claim 9, the first rupture area is defined by a single notch on the exterior surface and through at least part of the thickness of the first flange so that a remaining thickness remains on the first flange and the second flange comprises a second rupture area defined by a shoulder at a juncture of a first planar surface and a second planar surface, and wherein the second rupture area is located near an end of the pyrotechnic fuse in the shaped groove and the first rupture area is located further away from the end of the pyrotechnic fuse in the shaped groove than the second rupture area.

18. A method for disconnecting two elements using a charge comprising:
 providing a first plate shaped element comprising an edge;
 providing a second plate shaped element comprising a second edge;
 forming a shaped groove with a cavity with the first edge, a first flange comprising a first thickness and a first rupture area, a second flange comprising a second thickness and a second rupture area;
 placing a pyrotechnic fuse at a bottom of the shaped groove;
 introducing the second plate shaped element into the cavity of the shaped groove;
 forming a bore through the first flange, the second flange, and through either the first plate shaped element or the second plate shaped element; said bores being aligned and defining a first common bore;
 placing a mechanical connector through the common bore;
 securing the mechanical connector in place;
 igniting the pyrotechnic fuse and rupturing the first flange at the first rupture area and rupturing the second flange at the second rupture area; and
 wherein the first thickness and second thickness are unequal.

19. The method of claim 18, wherein the thickness of the second flange on either side of the second rupture area is unequal.

20. The method of claim 18, wherein the first flange comprises a first rupture area defined by a single notch on an outer surface and the second flange comprises a rupture area defined by a first planar surface and a second planar surface with a shoulder located therebetween.

21. The method of claim 18, further comprising forming a second common bore and securing a second mechanical connector therein.

* * * * *